US012017880B2

(12) United States Patent
Asamoto

(10) Patent No.: US 12,017,880 B2
(45) Date of Patent: Jun. 25, 2024

(54) TRANSPORT SYSTEM, TRANSPORT DEVICE, RECORDING SYSTEM, AND METHOD OF CONTROLLING TRANSPORT DEVICE

(71) Applicant: SEIKO EPSON CORPORATION, Tokyo (JP)

(72) Inventor: Katsuya Asamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 17/657,092

(22) Filed: Mar. 29, 2022

(65) Prior Publication Data

US 2022/0315375 A1 Oct. 6, 2022

(30) Foreign Application Priority Data

Mar. 31, 2021 (JP) ................................ 2021-059709

(51) Int. Cl.

*B65H 41/00* (2006.01)
*B41J 11/00* (2006.01)
*B65H 37/02* (2006.01)

(52) U.S. Cl.

CPC ........ *B65H 41/00* (2013.01); *B41J 11/00242* (2021.01); *B41J 11/007* (2013.01); *B65H 37/02* (2013.01); *B65H 2301/51122* (2013.01)

(58) Field of Classification Search

CPC .... B41J 11/00242; B41J 11/007; B41J 15/04; B41J 3/4078; B65H 20/06; B65H 2301/51122; B65H 2301/5143; B65H 2515/40; B65H 26/02; B65H 37/02; B65H 41/00

See application file for complete search history.

(56) References Cited

U.S. PATENT DOCUMENTS

| | | | | | |
|---|---|---|---|---|---|
| 5,136,307 | A * | 8/1992 | Uchida | .................. B41J 11/007 400/605 |
| 2006/0192830 | A1 | 8/2006 | Lee | |
| 2009/0237478 | A1* | 9/2009 | Hara | .................... B41J 11/0015 347/102 |
| 2022/0315375 | A1* | 10/2022 | Asamoto | .................. B41J 15/04 |

FOREIGN PATENT DOCUMENTS

| | | | |
|---|---|---|---|
| JP | 2006-315824 | A | 11/2006 |
| JP | 2007-504970 | T | 3/2007 |
| WO | WO2005/023551 | A | 3/2005 |

* cited by examiner

*Primary Examiner* — Sonya M Sengupta
(74) *Attorney, Agent, or Firm* — WORKMAN NYDEGGER

(57) ABSTRACT

A transport system includes a transport device and a peeling device. The transport device includes: a transporting belt including an adhesive layer and configured to transport a medium affixed to the adhesive layer; a heating unit configured to be able to heat the adhesive layer; a driving unit configured to drive the transporting belt; and a control unit including a detector configured to detect a load of the driving unit, the control unit being configured to control the driving unit and the heating unit. The peeling device is configured to peel the medium from the transporting belt. The detector is configured to be able to detect the load of the driving unit when the medium is peeled from the transporting belt by the peeling device, and the control unit controls the heating unit on the basis of a detection result from the detector.

7 Claims, 8 Drawing Sheets

TRANSPORT SYSTEM, TRANSPORT DEVICE, RECORDING SYSTEM, AND METHOD OF CONTROLLING TRANSPORT DEVICE

The present application is based on, and claims priority from JP Application Serial Number 2021-059709, filed on Mar. 31, 2021, the disclosure of which is hereby incorporated by reference herein in its entirety.

BACKGROUND

1. Technical Field

The present disclosure relates to a transport system, a transport device, a recording system, and a method of controlling a transport device.

2. Related Art

JP-T-2007-504970 discloses a recording device including a transporting belt including an adhesive layer, a recording unit configured to perform recording on a medium affixed to the adhesive layer, and a heating unit configured to heat the transporting belt. Here, it is known to improve the affixing property of the medium relative to the adhesive layer by heating the adhesive layer using the heating unit. Thus, accurate control of the heating unit is important to improve the affixing property of the medium.

In addition, JP-A-2006-315824 describes a recording device including a transporting belt including an adhesive layer, a recording unit configured to perform recording on a medium affixed to the adhesive layer, and a detector used to detect adhesion of the adhesive layer. As the transporting belt circulates in a state where the detector is in contact with the adhesive layer, the detector rotates in association with the circulation of the transporting belt. Once rotation of the detector stops due to a reduction in adhesion of the adhesive layer, this recording device makes notification of the timing of replacing the adhesive layer.

However, the adhesion of the adhesive layer deteriorates due to various types of factors such as ink attached on the front surface of the adhesive layer, attachment of medium fibers, or deterioration of the adhesive layer that occurs over time. Thus, the deterioration of the adhesive layer does not necessarily depend only on heating temperatures. That is, even if heating temperatures are appropriately managed, the adhesion of the adhesive layer changes due to other factors such as foreign materials attached to the front surface of the adhesive layer or deterioration in the adhesive layer itself. Thus, there is a problem in that, in some cases, the medium cannot be appropriately affixed in a state where the actual adhesion of the adhesive layer deteriorates.

Furthermore, the detector described in JP-A-2006-315824 detects the adhesion of the adhesive layer and makes notification of the timing of replacement. However, it is not possible to control the adhesive layer of the transporting belt so as to have appropriate adhesion during operation of the medium transport device.

SUMMARY

A transport system that solves the problem described above includes a transport device including a transporting belt including an adhesive layer and configured to transport a medium affixed to the adhesive layer, a heating unit configured to heat the adhesive layer, a driving unit configured to drive the transporting belt, and a control unit including a detector configured to detect a load of the driving unit, the control unit being configured to control the driving unit and the heating unit, the transport system also includes a peeling device configured to peel the medium from the transporting belt, in which the detector is configured to detect the load of the driving unit when the medium is peeled from the transporting belt by the peeling device, and the control unit controls the heating unit on the basis of a detection result from the detector.

A transport device that solves the problem described above provides a transport device including a transporting belt configured to transport a medium peeled by a peeling device, the transporting device including a heating unit configured to heat the transporting belt, a driving unit configured to drive the transporting belt, and a control unit including a detector configured to detect a load of the driving unit, the control unit being configured to control the driving unit and the heating unit, in which the transport belt includes an adhesive layer and is configured to transport the medium affixed to the adhesive layer, the heating unit is configured to heat the adhesive layer, the detector is configured to detect the load of the driving unit when the medium is peeled from the transporting belt by the peeling device, and the control unit controls the heating unit on the basis of a detection result from the detector.

A recording system that solves the problem described above includes a transporting belt including an adhesive layer and configured to transport a medium affixed to the adhesive layer, a recording unit configured to perform recording on the medium, a heating unit configured to heat the adhesive layer, a first driving unit configured to drive the transporting belt, a recording device including a first control unit configured to control the first driving unit and the heating unit, and a peeling device configured to peel the medium from the transporting belt, in which the peeling device includes a second driving unit configured to drive the peeling device and also includes a second control unit including a detector configured to detect a load of the second driving unit and configured to control the second driving unit, the detector is configured to detect the load of the second driving unit when the medium is peeled from the transporting belt by the peeling device, and the first control unit is configured to control the heating unit on the basis of a detection result from the detector.

A method of controlling a transport device that solves the problem described above provides a method of controlling a transport device including a transport belt including an adhesive layer and configured to transport a medium affixed to the adhesive layer, a heating unit configured to heat the adhesive layer, and a driving unit configured to drive the transporting belt, the method including detecting a load of the driving unit when the medium is peeled from the transporting belt, and controlling the heating unit on the basis of a value of the detected load.

DESCRIPTION OF EXEMPLARY EMBODIMENTS

Below, an embodiment of a recording system will be described with reference to the drawings.

Figure 1:
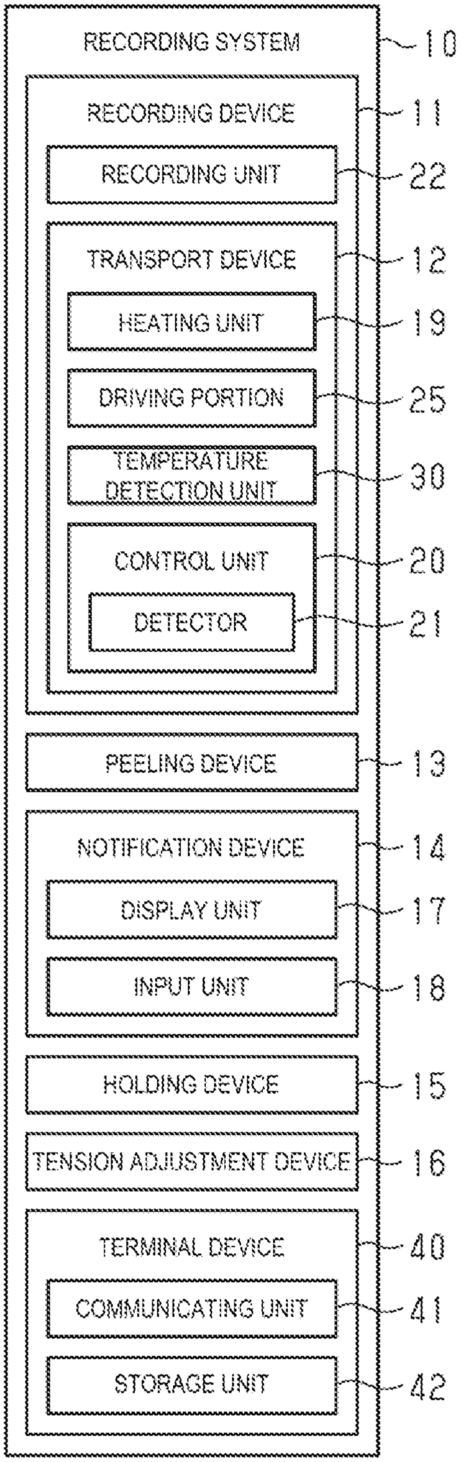
FIG. 1 is a block diagram illustrating a recording system according to a first embodiment.

As illustrated in FIG. 1, a recording system 10 includes a recording device 11 and a peeling device 13. The recording system 10 according to the present embodiment includes a notification device 14, a holding device 15, a tension adjustment device 16, and a terminal device 40 that can communicate with the recording device 11.

The notification device 14 according to the present embodiment includes a display unit 17 and an input unit 18.

The display unit 17 displays information. The display unit 17 is, for example, a liquid crystal display. The display unit 17 displays various types of information, whereby the notification device 14 notifies a user. The notification device 14 may make notification of an operating state of the transport device 12.

The input unit 18 is configured to receive input of an instruction. Thus, a user inputs an instruction into the input unit 18 at the time of operating the recording system 10. The instruction input into the input unit 18 is input into the recording device 11 through the notification device 14.

The input unit 18 is, for example, a touch panel. Thus, in the present embodiment, the display unit 17 and the input unit 18 are integrally configured. The input unit 18 may be, for example, a mouse or a keyboard.

The recording device 11 is an ink jet-type printer configured to eject ink serving as one example of a liquid onto a medium 99 such as fiber or a sheet to perform recording of an image such as a character or a photo.

The recording device 11 includes a recording unit 22, a transport device 12, and a control unit 20. The control unit 20 collectively controls the recording device 11, for example. The control unit 20 is configured so as to be able to communicate with the peeling device 13, the notification device 14, the holding device 15, the tension adjustment device 16, and the terminal device 40. The control unit 20 may control the peeling device 13, the notification device 14, the holding device 15, the tension adjustment device 16, and the terminal device 40.

The transport device 12 includes a transporting belt 23 (see FIG. 2) configured to transport the medium 99 serving as a target of recording by the recording unit 22. The transporting belt 23 includes an adhesive layer 32 (see FIG. 2), and transports the medium 99 affixed to the adhesive layer 32. The transporting belt 23 according to the present embodiment is a thermal-sensitive type glue belt having a front surface provided with an adhesive that exhibits adhesiveness when being heated as the adhesive layer 32. In the present Description, the adhesive is also referred to as a glue. The transport device 12 include a heating unit 19 configured to be able to heat the adhesive layer, and a driving unit 25 configured to drive the transporting belt 23. The transport device 12 includes a temperature detection unit 30 configured to be able to detect temperatures of the transporting belt 23. The temperature detection unit 30 is, for example, a thermistor or a non-contact type temperature sensor.

The terminal device 40 includes a communicating unit 41 used to communicate with the recording device 11, and a storage unit 42 that holds software used to edit image data to be transmitted to the recording device 11. The communicating unit 41 can transmit job data concerning image data or various types of data to the recording device 11 through a wired network or wireless network. The storage unit 42 includes a nonvolatile recording medium such as an SSD or an HDD, and is able to hold image data or various types of data. In addition, the terminal device 40 is electrically coupled to the notification device 14, and is able to perform edition of image data through the notification device 14.

Note that the notification device 14 may be included in the terminal device 40 or may be provided separately from the terminal device 40. When the notification device 14 is provided separately from the terminal device 40, a communication cable or the like is used to allow the notification device 14 to communicate information with the terminal device 40.

The control unit 20 may be configured as a circuit including one or more processors that implement various types of processes in accordance with a computer program, or one or more dedicated hardware circuits such as an application-specific integrated circuit that implements at least a portion of processes from among the various types of processes, or a combination thereof. The processor includes a CPU and memories such as a RAM and ROM, and the memories hold a program code or instruction configured so as to cause the CPU to implement processes. The memories, that is, computer-readable media include various types of readable media that general-type or dedicated computers can access.

The control unit 20 includes a detector 21. The detector 21 is, for example, a motor driver. In this case, in the control unit 20, the motor driver and the processor may be disposed at the same chip, or may be disposed at different chips.

The detector 21 is able to detect a load of the driving unit 25. The detector 21 according to the present embodiment detects a load of the driving unit 25 when the medium 99 is peeled from the transporting belt 23 by the peeling device 13. The control unit 20 according to the present embodiment outputs an electric-current instruction value to the motor driver to control an electric current flowing in the driving unit 25, thereby controlling a velocity of the transporting belt 23. With this configuration, the motor driver is able to detect the electric current value flowing in the driving unit 25. The driving unit 25 is controlled so as to drive at a target velocity. Thus, as the load at the time of driving the transporting belt 23 increases, the drive current increases. The electric current in the driving unit 25 changes in accordance with the load of the transporting belt 23.

The load that the transporting belt 23 receives from the medium 99 when the medium 99 is peeled from the transporting belt 23 depends on adhesion of the adhesive layer 32. As the adhesion of the adhesive layer 32 increases, the load that the detector 21 detects increases. The detector 21 detects the load of the driving unit 25 as the load current flowing in the driving unit 25. The control unit 20 controls the heating unit 19 on the basis of a detection result from the detector 21. In other words, the control unit 20 performs a heating-temperature controlling process in which heating temperatures of the heating unit 19 are controlled, on the basis of a detected value obtained by detecting the load of the driving unit 25. Note that details of the heating-temperature controlling process will be described later.

Figure 2:
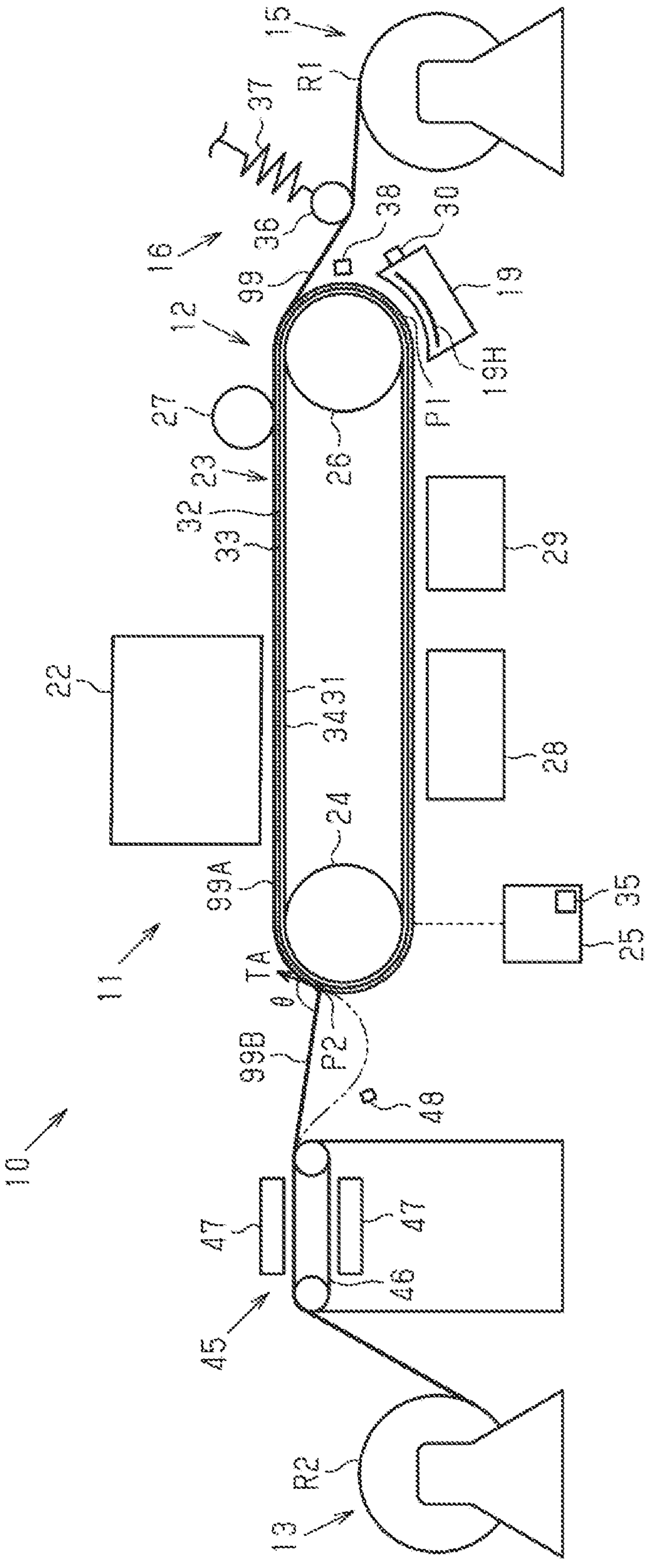
FIG. 2 is a side view schematically illustrating a recording system.

Next, the configuration of the recording system 10 will be described with reference to FIG. 2. As illustrated in FIG. 2, the recording device 11 includes the recording unit 22 and the transport device 12. The transport device 12 includes the transporting belt 23, a driving roller 24, the driving unit 25, and a driven roller 26. The transport device 12 according to the present embodiment includes the heating unit 19, a pressing portion 27, a cleaning portion 28, and a drying unit 29.

For example, the recording unit 22 discharges a liquid onto the medium 99. With this configuration, the recording unit 22 performs recording on the medium 99. The recording unit 22 is, for example, a head. The recording unit 22 may be a serial head that scans relative to the medium 99, or may be a line head that extends over the area substantially the same as the width of the medium 99.

Note that the recording unit 22 is not limited to the ink jet type, and it may be possible to employ an electrophotographic type in which solid toner is provided, and then, an image or the like is fixed on the medium 99 through various types of photosensitive manners.

The recording device 11 includes the transport device 12. The transport device 12 includes the transporting belt 23, the driving roller 24, and the driven roller 26. The transporting belt 23 includes a base member 31 and the adhesive layer 32.

The base member 31 is provided in an endless manner. The base member 31 includes a first surface 33 and a second surface 34 that is a surface opposite from the first surface 33. The first surface 33 is a surface that is to be the outer peripheral surface of the base member 31. The second surface 34 is a surface that is to be the inner peripheral surface of the base member 31.

The adhesive layer 32 is provided at the first surface 33. The adhesive layer 32 has adhesiveness. The adhesive layer 32 is made out of an adhesive having adhesiveness. The adhesive layer 32 is formed by applying an adhesive on the first surface 33. The adhesive layer 32 is formed throughout the entire circumference of the first surface 33. The adhesion of the adhesive layer 32 deteriorates as the recording device 11 is used or after a period of time elapses or the like. When the front surface layer is set as a layer of the front surface of the adhesive layer 32 where the medium 99 is affixed, the present embodiment employs an adhesive having a characteristic in which the adhesion of the adhesive layer 32 increases with increase in temperatures of the front surface layer of the adhesive layer 32. Note that it may be possible to employ an adhesive having a characteristic in which the adhesion of the adhesive layer 32 decreases with increase in temperatures of the front surface layer of the adhesive layer 32.

The adhesive layer 32 is a layer used to affix the medium 99. That is, the transporting belt 23 transports the medium 99 affixed to the adhesive layer 32. The recording unit 22 performs recording on the medium 99 during the time when the medium 99 is transported by the transporting belt 23. Thus, the recording unit 22 is disposed so as to be opposed to the first surface 33 relative to the base member 31. The recording unit 22 according to the present embodiment is disposed at a position higher than the transport device 12.

The transporting belt 23 is provided in an endless manner. The transporting belt 23 according to the present embodiment is wound around the driving roller 24 and the driven roller 26. With this configuration, the second surface 34 of the base member 31 is brought into contact with the driving roller 24 and the driven roller 26. The transporting belt 23 circulates to transport the medium 99. The transporting belt 23 circulates around the driving roller 24 and the driven roller 26. In other words, the transporting belt 23 rotates with the center being a central point of an imaginary straight line connecting from the center of rotation of the driving roller 24 to the center of rotation of the driven roller 26.

The driving roller 24 is configured in a rotatable manner. The driving roller 24 is coupled to the driving unit 25. The driving unit 25 is, for example, a motor. As the driving unit 25 drives, the driving roller 24 rotates. As the driving roller 24 rotates, the transporting belt 23 circulates. In this manner, the driving unit 25 transmits driving force to the driving roller 24 to drive the transporting belt 23. The driving unit 25 according to the present embodiment can rotate the driving roller 24 in both directions: a first direction and a second direction that is a reverse direction to the first direction. That is, the transporting belt 23 can circulate in both directions: a direction in which the medium 99 is transported and a reverse transport direction that is a reverse direction to the transport direction.

The driving unit 25 includes an encoder 35. The encoder 35 has a configuration used to detect the amount of rotation of the driving roller 24, the rotational speed, or the like. The encoder 35 enables the driving roller 24 to accurately rotate.

The driven roller 26 is configured in a rotatable manner. The driven roller 26 follows the circulation of the transporting belt 23. That is, the driven roller 26 rotates in association with the rotation of the driving roller 24.

The pressing portion 27 is disposed outside of the transport device 12. Thus, the pressing portion 27 is disposed so as to be opposed to the first surface 33 relative to the base member 31. The pressing portion 27 according to the present embodiment is disposed at a position higher than the transport device 12.

The pressing portion 27 presses the medium 99 against the transporting belt 23. This causes the medium 99 to be affixed to the adhesive layer 32. The pressing portion 27 according to the present embodiment presses downward the medium 99 toward the transporting belt 23. As the transporting belt 23 circulates, the pressing portion 27 causes the medium 99 to be sequentially affixed to the adhesive layer 32.

The pressing portion 27 is, for example, a rod that does not rotate. The pressing portion 27 may be a rotatable roller. For example, the pressing portion 27 reciprocates by a predetermined distance on the circumferential surface of the transporting belt 23 to effectively affix the medium 99 to the adhesive layer 32.

The cleaning portion 28 is disposed outside of the transporting belt 23. Thus, the cleaning portion 28 is disposed so as to be opposed to the first surface 33 relative to the base member 31. The cleaning portion 28 according to the present embodiment is disposed at a position lower than the transporting belt 23.

The cleaning portion 28 is brought into contact with the adhesive layer 32 to clean the adhesive layer 32. The cleaning portion 28 according to the present embodiment is brought into contact with the transporting belt 23 from below. The cleaning portion 28 includes, for example, a brush that is brought into contact with the adhesive layer 32. The cleaning portion 28 circulates the transporting belt 23 to sequentially clean the adhesive layer 32.

In the recording device 11, as the recording unit 22 performs recording on the medium 99, a liquid may be attached to the adhesive layer 32. The cleaning portion 28 cleans the adhesive layer 32 to remove the liquid attached to the adhesive layer 32.

The cleaning portion 28 according to the present embodiment cleans the adhesive layer 32 using a cleaning liquid. For example, the cleaning portion 28 brings a brush wet with the cleaning liquid into contact with the adhesive layer 32 to clean the adhesive layer 32. This enables the liquid attached to the adhesive layer 32 to be effectively removed. In this case, once the cleaning portion 28 cleans the adhesive layer 32, the transporting belt 23 gets wet with the cleaning liquid. The cleaning liquid is, for example, water.

The drying unit 29 is disposed outside of the transporting belt 23. Thus, the drying unit 29 is disposed so as to be opposed to the first surface 33 relative to the base member 31. The drying unit 29 according to the present embodiment is disposed at a position lower than the transporting belt 23.

The drying unit 29 dries the adhesive layer 32 that has been wet with the cleaning liquid. The drying unit 29 dries the adhesive layer 32, for example, by causing warm air to blow against the transporting belt 23. The drying unit 29 according to the present embodiment causes warm air to blow against the transporting belt 23 from below. As the transporting belt 23 circulates, the drying unit 29 sequentially dries the adhesive layer 32 that has been wet with the cleaning liquid.

The heating unit 19 is disposed outside of the transporting belt 23. Thus, the heating unit 19 is disposed so as to be opposed to the first surface 33 relative to the base member 31. The heating unit 19 according to the present embodiment is disposed at a position lower than the transporting belt 23 or at a side of the driven roller 26. The heating unit 19 is disposed so as to be opposed to a portion of the first surface 33 that is disposed at the upstream side of the pressing portion 27 and at the downstream side of the drying unit 29 in a direction in which the transporting belt 23 circulates at the time of performing recording on the medium 99.

The heating unit 19 heats the adhesive layer 32. The heating unit 19 includes, for example, a heater 19H. In place of the heater 19H, the heating unit 19 may be configured to include a warm-air blowing unit configured to heat using warm air. In other words, it is only necessary that the heating unit 19 can heat the medium 99, and the heating method may include any type of a radiation type, a conduction type, a warm-air blowing type (convection type), and a combination thereof.

The reason that the heating unit 19 is disposed at the position close to the pressing portion 27 as described above will be described below. This is because, by setting the distance from the pressing portion 27 to the heating position of the heating unit 19 toward the upstream side in a direction in which the belt circulates, to be equal to or shorter than a predetermined distance, the medium 99 is pressed against the adhesive layer 32 while the adhesion of the adhesive layer 32 having a temperature increased through heating is being still high. This makes it possible to achieve sticking force.

In addition, the transport device 12 includes the temperature detection unit 30 configured to be able to detect temperatures of the transporting belt 23. The temperature detection unit 30 may be a unit that indirectly detects temperatures of the transporting belt 23 by detecting temperatures of the heating unit 19, or may be a unit that directly detects temperatures of the transporting belt 23 in a non-contact manner. The temperature detection unit 30 may be a unit that detects temperatures of a metal radiation member such as an aluminum plate. The radiation member is heated with heat of the heater 19H that constitutes the heating unit 19, and radiates the heat to heat the transporting belt 23. In the example in FIG. 2, the transport device 12 also includes a second temperature detection unit 38 configured to detect temperatures of the transporting belt 23 in a non-contact manner.

The temperature detection unit 30 is used to control heating temperatures of the heating unit 19. The second temperature detection unit 38 is used to detect abnormal overheat of the transporting belt 23. Note that the second temperature detection unit 38 may be used to control heating temperatures of the heating unit 19, or may be configured to include one temperature detection unit both for the purpose of controlling heating and for the purpose of detecting overheating.

Next, a series of operations of the recording device 11 will be described with focus being placed on a specific region around the circumferential surface of the transporting belt 23.

First, the pressing portion 27 presses the medium 99 against the specific region around the circumferential surface of the transporting belt 23. Next, the recording unit 22 performs recording on the medium 99 affixed to this specific region. After this, the medium 99 affixed to this specific region is peeled off from the transporting belt 23 using the peeling device 13. Next, the cleaning portion 28 cleans this specific region. After this, the drying unit 29 dries this specific region. Next, the heating unit 19 heats this specific region. This heating increases the adhesion of the adhesive layer 32 at this specific region. Next, the pressing portion 27 presses the medium 99 against this specific region again. In this manner, as the transporting belt 23 circulates, an image is sequentially recorded at the medium 99.

Next, the holding device 15, the tension adjustment device 16, and the peeling device 13 will be described.

The holding device 15 holds a roll body in which the medium 99 is wound in a layered manner. The holding device 15 rotatably holds the roll body. The roll body held by the holding device 15 is a first roll body R1 around which a medium 99 prior to recording is wound in a layered manner. In the present embodiment, the transporting belt 23 drives to cause the medium 99 to be pulled out from the first roll body R1 held by the holding device 15. The pulled-out medium 99 is transported from the holding device 15 toward the recording device 11.

The tension adjustment device 16 includes, for example, a contact member 36 and an elastic member 37. The contact member 36 is brought into contact with the medium 99 between the holding device 15 and the recording device 11. The contact member 36 according to the present embodiment is brought into contact with a surface of the medium 99 where recording is performed by the recording unit 22. The contact member 36 may be, for example, a cylindrical rod that does not rotate, or may be a rotatable roller.

The elastic member 37 has elasticity. The elastic member 37 is attached to the contact member 36. The elastic member 37 is, for example, a spring. The elastic member 37 expands and contracts in accordance with tension acting on the medium 99 between the holding device 15 and the recording device 11. That is, when the tension acting on the medium 99 is large, the elastic member 37 contracts. When the tension acting on the medium 99 is small, the elastic member 37 expands. In this manner, the tension adjustment device 16 makes adjustment such that the tension of the medium 99 between the holding device 15 and the recording device 11 is substantially constant.

The peeling device 13 holds the roll body in which the medium 99 is wound in a layered manner. The peeling device 13 rotatably holds the roll body. The roll body held by the peeling device 13 is a second roll body R2 around which the medium 99 that has passed through the recording device 11 is wound in a layered manner.

The peeling device 13 may be configured to include a drying unit 45 between the transporting belt 23 and the roll body. The drying unit 45 includes a transport unit 46 configured to transport the medium 99, and drying portions 47 configured to dry the medium 99 transported by the transport unit 46. The drying portions 47 are disposed, for example, at both sides of the medium 99 with the transport path for the medium 99 being interposed therebetween. The drying portions 47 may be of a heater type or a warm air type. The peeling device 13 includes a sensor 48 configured to be able to detect the medium 99. Upon detecting the medium 99 by the sensor 48, the peeling device 13 drives by a predetermined amount in a direction in which the medium 99 is rolled up.

With this configuration, the peeling device 13 in the recording system 10 rolls up the medium 99 from the recording device 11. That is, the peeling device 13 collects the medium 99. Driving force is transmitted to the peeling device 13 from a driving source such as a motor, which is not illustrated, and the peeling device 13 rolls up the medium 99 from the recording device 11 with a predetermined rotational torque.

The peeling device 13 peels the medium 99 from the transporting belt 23. The peeling device 13 according to the present embodiment rotates the second roll body R2 to peel the medium 99 from the transporting belt 23. Specifically, the peeling device 13 peels the medium 99 at a peeling position P2 at the driving roller 24 and of the circumferential surface of the transporting belt 23. Predetermined tension acts on a medium 99B that is a portion of the medium 99 and extends from the peeling position P2 to the peeling device 13, and thus, almost no slack exists on the medium 99B. Here, a medium 99A is set as a portion of the medium 99 that is affixed to the adhesive layer 32 at a position upstream of the peeling position P2 in a direction in which the transporting belt 23 circulates. At this time, the angle formed by the medium 99A and the medium 99B, that is, the peeling angle θ is less than 90 degrees at and around the peeling position P2. In the present embodiment, the peeling angle θ decreases as the adhesion of the adhesive layer 32 increases. That is, the peeling position P2 relative to the driving roller 24 changes in accordance with the adhesion.

Tension Te based on the adhesion acting between the adhesive layer 32 and the medium 99 acts on the medium 99B that is a portion of the medium 99. The tension Te acts from the peeling position P2 toward the peeling device 13. Here, the peeling angle θ is less than 90 degrees, and hence, the direction of a component TA along the medium 99A of the components of the tension Te gets close to the reverse transport direction. The component TA along the medium 99A is expressed as $T\times\cos\theta$. At this time, when the medium 99 is peeled from the transporting belt 23 by the peeling device 13 in a case where no slip occurs between the driving roller 24 and the transporting belt 23, the torque based on the component TA along the medium 99A acts so as to resist against the rotational torque of the driving roller 24. Thus, peeling the medium 99 from the transporting belt 23 by the peeling device 13 serves as resistance in terms of the transporting belt 23 that circulates. That is, when the peeling device 13 peels the medium 99 from the transporting belt 23, a load occurs in the driving unit 25. When the load occurs in the driving unit 25, a load current according to the magnitude of this load flows in the driving unit 25.

As the adhesion of the adhesive layer 32 increases, the resistance occurring in the driving unit 25 as a result of peeling of the medium 99 from the transporting belt 23 increases. Thus, as the adhesion of the adhesive layer 32 increases, the load current flowing in the driving unit 25 in order for the transporting belt 23 to output a target transport velocity increases. On the contrary, as the adhesion of the adhesive layer 32 decreases, the load current flowing in the driving unit 25 in order for the transporting belt 23 to output a target transport velocity decreases. That is, when the adhesion of the adhesive layer 32 is large, the load current flowing in the driving unit 25 is large, as compared with when the adhesion of the adhesive layer 32 is small. In this manner, with the medium 99 being peeled from the transporting belt 23, a load current according to the magnitude of the adhesion flows in the driving unit 25. That is, the load current represents a current supplied to the driving unit 25 in order for the transporting belt 23 to output a target transport velocity when the medium 99 is caused to be peeled from the adhesive layer 32.

Details of Heating Temperature Control

Next, heating temperature control by the control unit 20 will be described with reference to FIGS. 3 and 4. The control unit 20 controls the heating unit 19 on the basis of a detection result from the detector 21. When the medium 99 is peeled from the transporting belt 23 by the peeling device 13, the detector 21 detects a load of the driving unit 25. Thus, the control unit 20 controls the heating unit 19 on the basis of the load of the driving unit 25 detected by the detector 21 when the medium 99 is peeled from the transporting belt 23 by the peeling device 13. Specifically, the control unit 20 controls the heating unit 19 on the basis of a load current flowing in the driving unit 25 according to the load that the transporting belt 23 received from the medium 99 when the medium 99 is peeled from the transporting belt 23 by the peeling device 13. Here, the value of the load current increases with increase in the adhesion of the adhesive layer 32, and the value of the load current decreases with decrease in the adhesion of the adhesive layer 32. In addition, even when the adhesion is the same, the sticking force varies if the medium type differs. Furthermore, in order to prevent the medium from being positionally shifted on the transporting belt 23, the sticking force needs to be equal to or more than a threshold value regardless of medium types. Thus, the control unit 20 controls the heating unit 19 to be at temperatures at which necessary sticking force can be obtained, on the basis of the load current detected by the detector 21.

The control unit 20 stores, for each medium type, reference data indicating a relationship between detected loads (load current values that are values of load current in this example) and adhesion in a storage unit such as a memory. This reference data is created on the basis of measured data obtained by measuring a relationship between adhesion of the adhesive layer 32 and a load current value through experiments with various medium types or on the basis of simulation data obtained by simulating this relationship.

The control unit 20 estimates the present sticking force on the basis of the load current value, and performs feedback control of a heating temperature of the heating unit 19 so that the present sticking force that has been estimated is brought close to the target sticking force. This feedback control may be performed such that the value of the sticking force obtained by converting the load current value is set as a control variable, or may be performed such that the load current value detected by the detector 21 is used directly as a control variable.

Here, as illustrated in FIG. 2, the heating position P1 is set as a position where the transporting belt 23 is heated by the heating unit 19, and the peeling position P2 is set as a position where the medium 99 is peeled from the transporting belt 23. Incidentally, the sticking force is determined according to the adhesion and the medium type. Thus, when the medium type is the same, the load current detected by the detector 21 is a value according to the adhesion. The load detected at the peeling position P2 where the medium 99 is peeled from the transporting belt 23 depends on a heating temperature heated at the heating position P1 a predetermined time ago. A time T1 required for a position on the transporting belt 23 to move from the heating position P1 to the peeling position P2 is expressed as T1=D/V, where D is a distance from the heating position P1 to the peeling position P2 along the outer peripheral surface of the transporting belt 23, and V is a movement velocity of the transporting belt 23. The sticking force detected at the peeling position P2 is obtained as a result of heating at a heating temperature the required time T1 ago. Thus, the control unit 20 takes the time lag corresponding to the distance D into consideration, and on the basis of the value of the load detected at the peeling position P2, the control unit 20 controls the heating temperature at timing when a position on the transporting belt 23 disposed at the peeling position P2 reaches the heating position P1 next time.

Furthermore, the sticking force of the medium 99 is not limited to be constant throughout the entire lap of the transporting belt 23, and may decrease at a portion of the adhesive layer 32 where a foreign material such as ink or a medium fiber is attached, or may decrease at a portion where the adhesive layer 32 deteriorates. Thus, in the present embodiment, the sticking force (load) for one lap of the transporting belt 23 is measured to acquire history information concerning the sticking force for one lap of the belt. Then, on the basis of this load history information, the control unit 20 controls a heating temperature of the heating unit 19 so that necessary sticking force can be obtained even at a position where adhesion deteriorates due to attachment of a foreign material or deterioration of adhesive.

Figure 3:
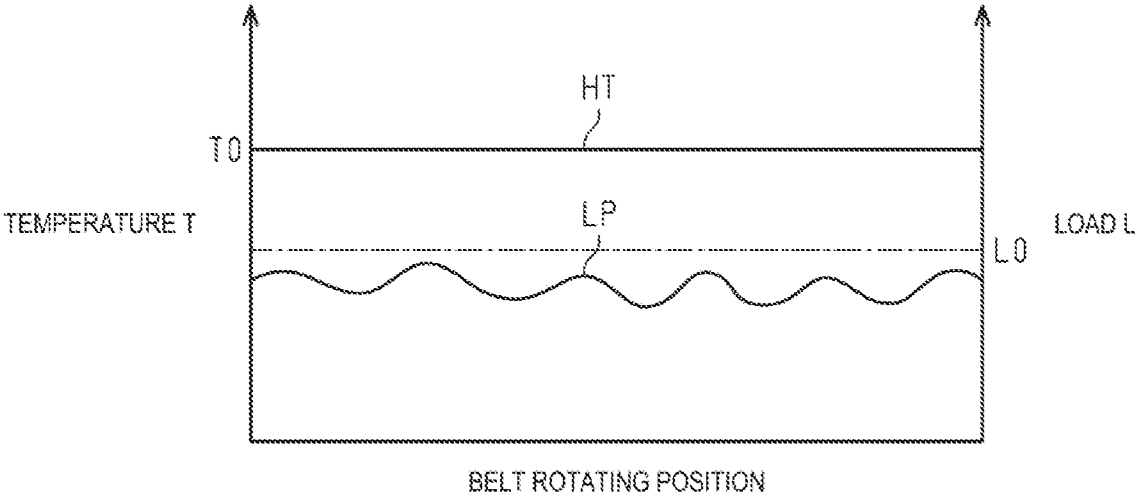
FIG. 3 is a graph used to explain load history information.

FIG. 3 illustrates load history information LP for one lap of the belt. In the graph in FIG. 3, the horizontal axis indicates belt rotating positions for one lap of the belt, and the vertical axis indicates temperatures T and loads L. For example, the starting point is set at a position on the transporting belt 23 that corresponds to the peeling position P2 at the time of starting measurement of a load. Then, belt rotating positions are expressed as positions on the transporting belt 23 that pass the peeling position P2 during a period of time in which the transporting belt 23 rotates one turn (one lap) from the start of measurement of the load. The graph in FIG. 3 indicates the temperature history information HT and the load history information LP. Upon temperatures of the transporting belt 23 reaching a target temperature T0, the control unit 20 starts measuring the load history information LP. The control unit 20 detects, for one lap of the belt, the load at the peeling position P2 where the medium 99 is peeled from the transporting belt 23 at the target temperature T0, to acquire the load history information LP for one lap of the belt.

There are portions where adhesion deteriorates due to a foreign material being attached to the adhesive layer 32 or deterioration of adhesive, and thus, the load history information LP for one lap of the belt is history information in which the load varies within one lap of the belt, as illustrated in FIG. 3. At the time of acquiring the load history information LP for one lap of the belt at the initial stage, the control unit 20 controls the heating unit 19 so that the transporting belt 23 is at the target temperature T0, on the basis of detected temperatures by the temperature detection unit 30.

Figure 4:
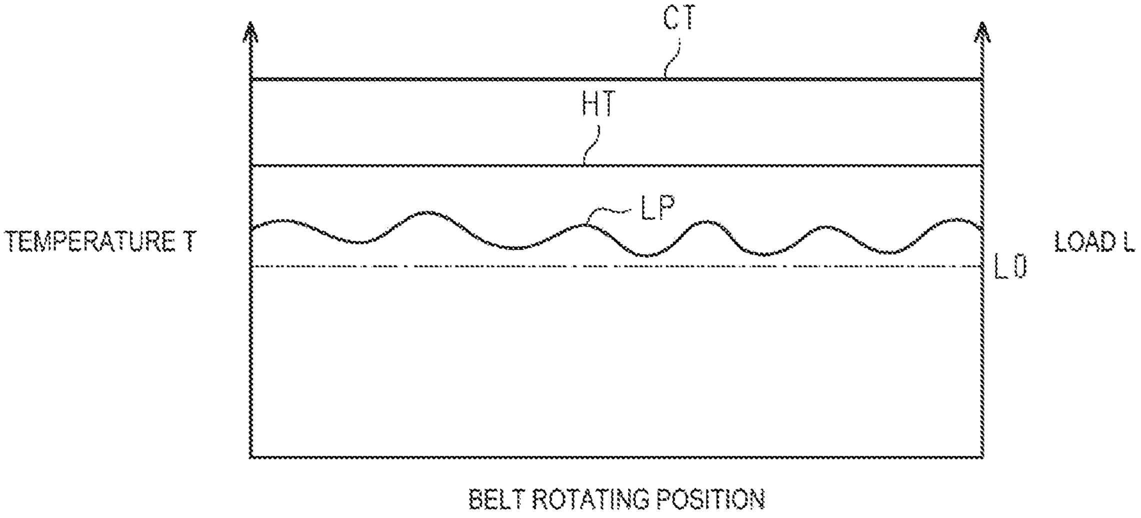
FIG. 4 is a graph used to explain a heating-temperature controlling process.

FIG. 4 is a graph for explaining a heating-temperature controlling process used to control the heating unit 19 on the basis of the load history information LP illustrated in FIG. 3. In the graph in FIG. 4, the horizontal axis indicates belt rotating positions, and the vertical axis indicates temperatures T and loads L, as in FIG. 3. The control unit 20 controls a heating temperature of the heating unit 19 so as to be able to obtain a target load L0 corresponding to the target sticking force, on the basis of the load history information LP at a time of one lap of the belt ago. The control unit 20 controls a heating temperature of the heating unit 19 using, as a target temperature, a control temperature CT illustrated in the graph in FIG. 4, on the basis of the load history information LP illustrated in FIG. 3. The control temperature CT is greater than values of temperature history information HT. With the heating-temperature controlling process being performed by this control unit 20, the heating unit 19 is controlled so that the sticking force estimated on the basis of loads L detected at the peeling position P2 is the target sticking force estimated on the basis of the target load L0. Specifically, control is performed so that the minimum value of the load history information LP in FIG. 3 is equal to or more than the target load L0. During one lap of the belt in which the heating-temperature controlling process is performed in FIG. 4, the load history information LP for the next one lap of the belt is acquired. In this manner, the load history information LP for one lap of the belt is acquired every time the transporting belt 23 rotates one turn. Then, the control unit 20 controls the heating temperature of the heating unit 19 for the next one lap of the belt, on the basis of the load history information LP acquired in the previous one lap of the belt. Note that, after this, the heating-temperature controlling process may be performed for each lap on the basis of the load history information LP for one lap of the belt at the initial stage.

The control described above is control at the time of using an adhesive having a characteristic in which the adhesion of the adhesive layer 32 increases with increase in temperatures of the front surface layer of the adhesive layer 32. However, the mode of control is not limited to this. For example, in a case of using an adhesive having a characteristic in which the adhesion of the adhesive layer 32 decreases with increase in temperatures of the front surface layer of the adhesive layer 32, the control temperature CT may be controlled so that the control temperature CT is less than values of temperatures included in the temperature history information HT. Even in such a case, the minimum value of the load history information LP in FIG. 3 is controlled so as to be equal to or greater than the target load L0.

There is set a warm-up period (heating preparation period) in which the transporting belt 23 is heated to the target temperature before the control unit 20 moves to the heating temperature control. In the warm-up period, a warm-up operation is performed. In the warm-up operation, the transporting belt 23 is heated without the medium 99 while the transporting belt 23 is being caused to circulate. Then, once the transporting belt 23 reaches the target temperature in the warm-up operation, the medium 99 is set at the transporting belt 23 to start a recording operation in which the recording unit 22 performs recording on the medium 99. After the transporting belt 23 reaches the target temperature T0, a peeling operation in which the medium 99 is peeled from the transporting belt 23 is started. After this, since there is no load history information LP for the first one lap of the belt, the control unit 20 acquires the load history information LP for one lap of the belt illustrated in FIG. 3 while maintaining the target temperature T0.

Details of Display by Display Unit

Figure 5:
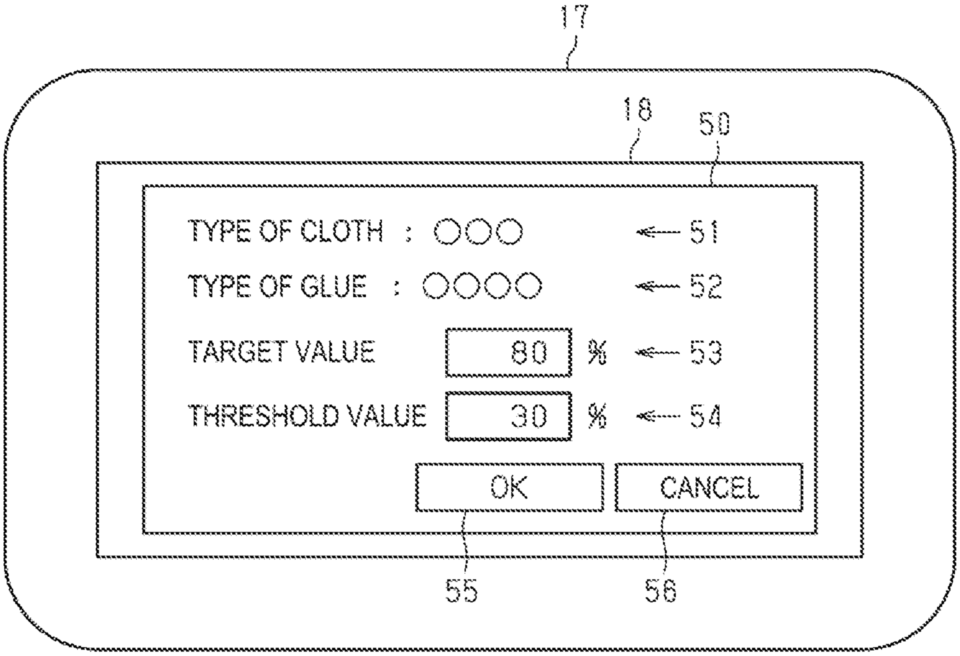
FIG. 5 is a schematic view illustrating a setting screen.

As illustrated in FIG. 5, the display unit 17 displays a setting screen 50. Setting data concerning a type of cloth and type of glue, the target value of adhesion, and values of threshold values for adhesion can be input into this setting screen 50. The setting screen 50 includes an input column 51 for the type of cloth and an input column 52 for the type of glue. Even when the heating temperatures are the same, the sticking force of the medium 99 relative to the adhesive layer 32 varies depending on the type of cloth and the type of glue. Thus, the control unit 20 may suggest, at the setting screen 50, a target temperature based on information about the type of cloth and the type of glue at the time of warm-up.

The control unit 20 according to the present embodiment controls the heating unit 19 so that the sticking force of the medium 99 relative to the adhesive layer 32 has a constant value. Here, the load of the driving unit 25 includes a driving load that causes the transporting belt 23 to drive, a peeling load at the time when the medium 99 is peeled, and a contact load that is received from a contact item such as the pressing portion 27 or the cleaning portion 28. In the present embodiment, when the movement velocity of the transporting belt is constant, the driving load and the contact load are regarded as being substantially constant. In addition, the peeling load increases with increase in the sticking force of the medium 99. In other words, the peeling load has a value corresponding to the sticking force.

Thus, the control unit 20 controls the heating unit 19 so that the load of the driving unit 25 is constant. This enables the control unit 20 to control the heating unit 19 so that the sticking force is constant.

Furthermore, the setting screen 50 illustrated in FIG. 5 includes an input column 53 for the target value and an input column 54 for the threshold value. In the present embodiment, the target value is expressed as a relative value (%) with the maximum load current being 100. In addition, the threshold value is also expressed as a relative value (%) with the maximum load current being 100. Here, the maximum load current is a default value of the load current detected on this adhesive layer 32 at the time of detecting the sticking force.

The target value is a target value of the sticking force desired by a user. When the target value is increased more than necessary, the heating temperature of the heating unit 19 increases more than necessary, which leads to an increase in consumption power of the heating unit 19. Thus, in order to save the consumption power, the user can set a relative value of the sticking force. The threshold value is a value that defines the timing of replacing the adhesive layer 32. Since the type of cloth used or type of glue used differ from user to user, the necessary sticking force also differs. In addition, even when the adhesion is the same, the necessary sticking force differs depending on the type of cloth (type of medium). Thus, a threshold value that defines the timing of replacing the adhesive layer 32 can be set for each user.

The adhesion of the adhesive layer 32 deteriorates with time. Thus, in terms of detecting the sticking force, the largest load current is a load current detected for the first time on the adhesive layer 32. The load current detected for the first time is referred to as the maximum load current. Note that the minimum sticking force that should be set as the timing of replacing the adhesive layer 32 is set in the control unit 20 in advance. The relative value of the minimum adhesion corresponding to the maximum sticking force calculated on the basis of the maximum load current is set as the minimum value of the threshold value. The threshold value within a range of not less than the minimum threshold value can be input into the input column 54.

Note that, in place of the setting value for the sticking force, it may be possible to employ a configuration in which a setting value for the adhesion is input at the input column 53, 54 of the setting screen 50. Since the sticking force is determined depending on the adhesion and the type of cloth (type of medium), it may be possible to employ a configuration in which the reference data stored in a memory for each type of cloth and indicating a relationship between the sticking force (load current) and the adhesion is referred to, and the control unit 20 calculates the target sticking force and an affixing threshold value on the basis of the relative value of each adhesion input at the input columns 53 and 54.

In addition, an OK button 55 and a cancel button 56 are displayed at the setting screen 50. The OK button 55 is a button used to fix the setting value. When the OK button 55 is pressed in a state where texts and input values are input in all the items, the setting values are fixed. The cancel button 56 is a button used to cancel the setting values. When the cancel button 56 is pressed, the setting screen 50 is closed.

Operation of Embodiment

Next, operation of the recording system 10, the recording device 11, and the transport device 12 will be described. Below, one example of the heating-temperature controlling process performed by the control unit 20 will be described with reference to FIGS. 5 to 7. The control unit 20 according to the present embodiment performs the heating-temperature controlling process used to control the heating unit 19, in parallel with recording of an image. For example, a user operates the touch-panel-type input unit 18 at the setting screen 50 displayed at the display unit 17, thereby inputting various types of setting values. The user selects information about the type of medium and the type of glue from a list at the setting screen 50 and inputs it. Furthermore, the user inputs the target value and the threshold value at the setting screen 50. The target value can be input through the input unit 18. The threshold value can be input through the input unit 18.

Below, the heating-temperature controlling process performed by the control unit 20 will be described.

In step S11, the control unit 20 performs the warm-up operation. Specifically, the control unit 20 controls the heating unit 19 on the basis of a detection result of the temperature detection unit 30 and in accordance with a predetermined temperature-increasing profile. In this example, the control unit 20 controls an electric current value of the heater 19H that the heating unit 19 includes. With this configuration, the heater temperature (that is, the detected temperature) is raised until it reaches the target temperature. The target temperature is a temperature at which appropriate sticking force can be obtained. This target temperature is determined on the basis of the type of medium and the type of glue. The control unit 20 acquires information about the type of medium and the type of glue on the basis of information input into the setting screen 50.

In step S12, the control unit 20 determines whether or not the temperature reaches the target temperature. When the temperature reaches the target temperature, the process proceeds to step S13. When the temperature does not reach the target temperature, the process continues the warm-up operation in step S11.

In step S13, the control unit 20 starts printing. The control unit 20 starts to transport the medium 99, and also causes the recording unit 22 to record an image based on recorded data, to the medium 99. At this time, since the heater temperature reaches the target temperature, the medium 99 is affixed to the belt with necessary sticking force.

However, the glue (adhesive) of the front surface of the belt has the deteriorated adhesion at a location where a liquid such as ink discharged by the recording unit 22 is attached, at a location where cloth fiber is attached, a location where the glue is detached, or the like. Thus, the adhesion varies depending on locations of the belt in one lap in the circumferential direction thereof. In other words, the sticking force varies depending on locations of the belt in one lap in the circumferential direction thereof. The present embodiment performs control of heater temperatures so that the variation in this sticking force in one lap of the belt is reduced.

In step S14, the control unit 20 detects a load for one lap of the belt. The control unit 20 detects a load of the driving unit 25. Specifically, the control unit 20 detects a load current in the driving unit 25 using the detector 21. That is, the control unit 20 sets the load current detected using the detector 21, as the load of the driving unit 25. Note that the control unit 20 detects the load of the driving unit 25 during the period when the transporting belt 23 circulates one turn from the start of the peeling operation in which the medium 99 after recording is peeled from the transporting belt 23. Whether or not the peel operation for the medium 99 has been started may be detected on the basis of the load of the driving unit 25 or may be determined on the basis of an instruction from the input unit 18. For example, upon ending of the warm-up operation, a user sets the medium 99 at the belt to start printing, or transports the medium 99 using the transporting belt 23 without printing, and the tip portion of the medium 99 is wound around the core member. After this, a winding operation in which the peeling device 13 winds the medium 99 into the second roll body R2 is started to start the peeling operation in which the medium 99 is peeled from the transporting belt 23.

In step S15, the control unit 20 acquires the load history information for one lap of the belt. Here, the load history information for one lap of the belt is history information indicating a relationship between the load of the driving unit 25 and belt rotating positions for one lap of the belt in the past one turn. For example, the load history information illustrated in FIG. 3 is obtained. This load history information can be obtained with the heater temperature being a constant target temperature T0. As can be understood from the graph in FIG. 3, the load for one lap of the belt varies depending on locations. Note that the position where the load history information is measured is the peeling position P2 on the transporting belt 23. The peeling position P2 at the start of detection of the load to create the load history information is the position for starting measurement, and the load history information can be acquired for one lap of the belt from the position for starting measurement.

In step S16, the control unit 20 calculates the belt adhesion. The control unit 20 calculates an average value of loads for one lap of the belt, for example, on the basis of the load history information LP. The average value of loads is calculated by dividing the integrated value of loads for one lap of the belt by the number of measurement points (detection points). The control unit 20 refers to the reference data to convert the average value of loads into the value of adhesion, thereby acquiring the belt adhesion. Here, the belt adhesion is evaluated on the basis of the sticking force of the medium 99. Thus, the belt adhesion as used here is the same meaning as the sticking force of the medium 99 relative to the adhesive layer 32. Note that the reference data indicating a relationship between the load and the adhesion is stored in the memory for each type of cloth.

In step S17, the control unit 20 determines whether or not the belt adhesion reaches the target value. When the belt adhesion does not reach the target value, the process proceeds to step S18. On the other hand, when the belt adhesion reaches the target value, the process proceeds to step S21.

In step S18, the control unit 20 determines whether or not the heating unit 19 is at the maximum output. When the heating unit 19 is not at the maximum output, the process proceeds to step S19. After the output of the heating unit 19 is increased by a predetermined amount from the current output, the process proceeds to step S14. When the belt adhesion does not reach the target value even if the output is increased by the predetermined amount and reaches the maximum output (No in both steps S17 and S18), the control unit 20 proceeds to step S20.

Figure 6:
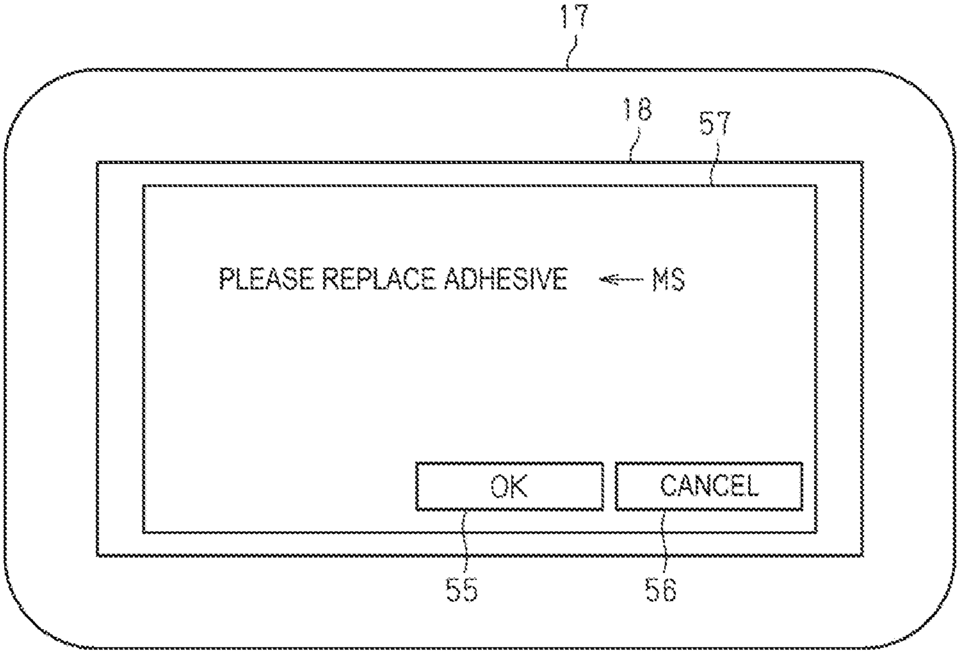
FIG. 6 is a schematic view illustrating a notification screen.
Figure 7:
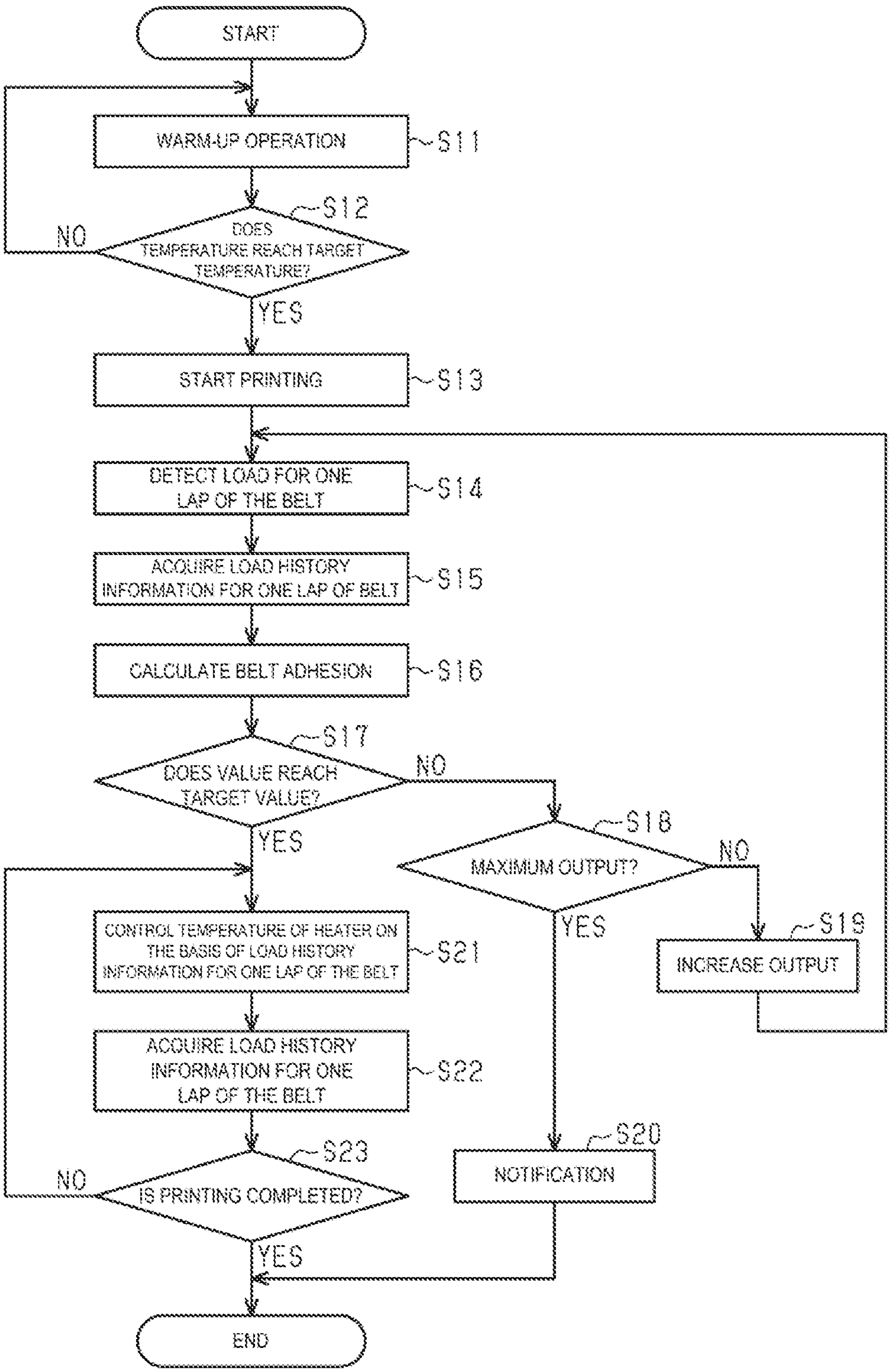
FIG. 7 is a flowchart showing a heating-temperature controlling process.

In step S20, the control unit 20 gives notification of information indicating the timing of replacing the adhesive. Specifically, the control unit 20 displays a message MS that prompts the replacement of the adhesive, at the notification screen 57 of the display unit 17 as illustrated in FIG. 6.

That is, when the transporting belt 23 is heated at the maximum output that the heating unit 19 can output (step S18) and the sticking force based on the load current is equal to or less than a threshold value, the control unit 20 causes the notification device 14 to give notification of information that prompts the replacement of the adhesive.

In step S21, the control unit 20 controls temperatures of the heater on the basis of the load history information for one lap of the belt. That is, the control unit 20 controls heating temperatures of the heating unit 19 on the basis of the load history information LP for one lap of the belt illustrated in FIGS. 3 and 4.

In step S22, the control unit 20 acquires load history information for the current one lap of the belt. That is, the control unit 20 acquires the load history information LP for one lap of the belt illustrated in FIG. 4 during the current one lap of the belt. The control unit 20 performs the process in step S21 and the process in step S22 at each belt rotating position during the current one lap of the belt.

With this heating temperature control by the control unit 20, it is possible to obtain the adhesion that can achieve affixing with the target sticking force in a region where the pressing portion 27 affixes the medium 99 to the adhesive layer 32. Thus, it is possible to affix the medium 99 to the adhesive layer 32 with appropriate sticking force.

In step S21, the control unit 20 determines whether or not printing ends. When printing has not yet ended, the process returns to step S21, and each of the processes in step S21 and step S21 is repeatedly performed. Then, once printing ends, the control unit 20 ends a routine of this heating-temperature controlling process.

As described in detail above, the present embodiment provides the following effects.

(1) The transport system includes the transport device 12 and the peeling device 13. The transport device 12 includes: the transporting belt 23 including the adhesive layer 32 and configured to transport the medium 99 affixed to the adhesive layer 32; the heating unit 19 configured to heat the adhesive layer 32; the driving unit 25 configured to drive the transporting belt 23; and the control unit 20 including the detector 21 configured to detect a load of the driving unit 25, the control unit 20 being configured to control the driving unit 25 and the heating unit 19. The peeling device 13 peels the medium 99 from the transporting belt 23. The detector 21 is configured to be able to detect the load of the driving unit 25 when the medium 99 is peeled from the transporting belt 23 by the peeling device 13, and the control unit 20 controls the heating unit 19 on the basis of a detection result from the detector 21. With this configuration, it is possible to control the heating unit 19 on the basis of the load of the driving unit 25 when the medium 99 is actually peeled. As the sticking force of the medium 99 relative to the transporting belt 23 changes, the load of the driving unit 25 at the time when the medium 99 is peeled also changes. Thus, it is possible to heat the adhesive layer 32 with a temperature at which necessary sticking force can be obtained. Note that, since the load of the driving unit 25 when the actually used medium 99 is peeled from the adhesive layer 32 is detected, the sticking force can be detected with high accuracy. This makes it possible to accurately control the heating unit 19 so that necessary sticking force can be obtained.

(2) The transport system includes the notification device 14 configure to make notification of an operating status of the transport device 12. When the heating unit 19 heats the transporting belt 23 with the maximum output that the heating unit 19 can output, the control unit 20 causes the notification device 14 to make notification of information that prompts replacement of the adhesive when the adhesion based on the load current serving as one example of the load is equal to or less than a threshold value. This allows the user to easily acquire an indication of replacement of the adhesive.

(3) The transport system includes the input unit into which an instruction is input. The threshold value can be input through the input unit 18. This makes it possible to set the optimum threshold value in accordance with a user.

(4) The transport system includes the temperature detection unit 30 configured to be able to detect temperatures of the transporting belt 23. This makes it possible to appropriately control the heating unit 19 on the basis of a detection result of the temperature detection unit 30 even in the heating preparation period (warm-up period) prior to detection of a load of the driving unit 25 at the time when the medium 99 is peeled from the transporting belt 23.

(5) The transport device 12 includes the transporting belt 23 configured to transport the medium 99 that is to be peeled by the peeling device 13. The transport device 12 includes: the heating unit 19 configured to be able to heat the transporting belt 23; the driving unit 25 configured to drive the transporting belt 23; and the control unit 20 including the detector 21 configured to detect a load of the driving unit 25, the control unit 20 being configured to control the driving unit 25 and the heating unit 19. The transporting belt 23 includes the adhesive layer 32, and is configured to be able to transport the medium 99 affixed to the adhesive layer 32. The heating unit 19 is configured to be able to heat the adhesive layer 32. The detector 21 is configured to be able to detect a load of the driving unit 25 when the medium 99 is peeled from the transporting belt 23 by the peeling device 13. The control unit 20 controls the heating unit 19 on the basis of a detection result from the detector 21. Thus, it is possible to heat the adhesive layer 32 with a temperature at which necessary sticking force can be obtained.

(6) The recording system 10 includes the recording device 11 and the peeling device 13. The recording device 11 includes the transporting belt 23 including the adhesive layer 32 and configured to transport the medium 99 affixed to the adhesive layer 32. The recording device 11 includes: the recording unit 22 configured to be able to perform recording on the medium 99; the heating unit 19 configured to be able to heat the adhesive layer 32; the driving unit 25 configured to drive the transporting belt 23; and the control unit 20 including the detector 21 configured to detect a load of the driving unit 25, the control unit 20 being configured to control the driving unit 25 and the heating unit 19. The peeling device 13 is configured to peel the medium 99 from the transporting belt 23. The detector 21 is configured to be able to detect a load current flowing in the driving unit 25 when the medium 99 is peeled from the transporting belt 23 by the peeling device 13. The control unit 20 has a feature of controlling the heating unit 19 on the basis of a detection result from the detector 21. This configuration makes it possible to heat the adhesive layer 32 at a temperature at which necessary sticking force can be obtained. Thus, it is possible to affix the medium 99 to the transporting belt 23 with appropriate sticking force, which improves accuracy of recording.

(7) Provided is a method of controlling the transport device 12 including: the transporting belt 23 including the adhesive layer 32 and configured to transport the medium 99 affixed to the adhesive layer 32; the heating unit 19 configured to be able to heat the adhesive layer 32; and the driving unit 25 configured to drive the transporting belt 23. This controlling method includes: detecting a load of the driving unit 25 when the medium 99 is peeled from the transporting belt 23 (step S14); and controlling the heating unit 19 on the basis of a value of the detected load (step S21). This method makes it possible to heat the adhesive layer 32 with a temperature at which necessary sticking force can be obtained.

Second Embodiment

Next, a second embodiment will be described with reference to FIGS. 8 and 9. The recording system 10 basically has a configuration similar to that in the first embodiment. The second embodiment differs from the first embodiment in a configuration in which the control unit of the peeling device 13 detects a load of the driving unit of the peeling device 13.

Figure 8:
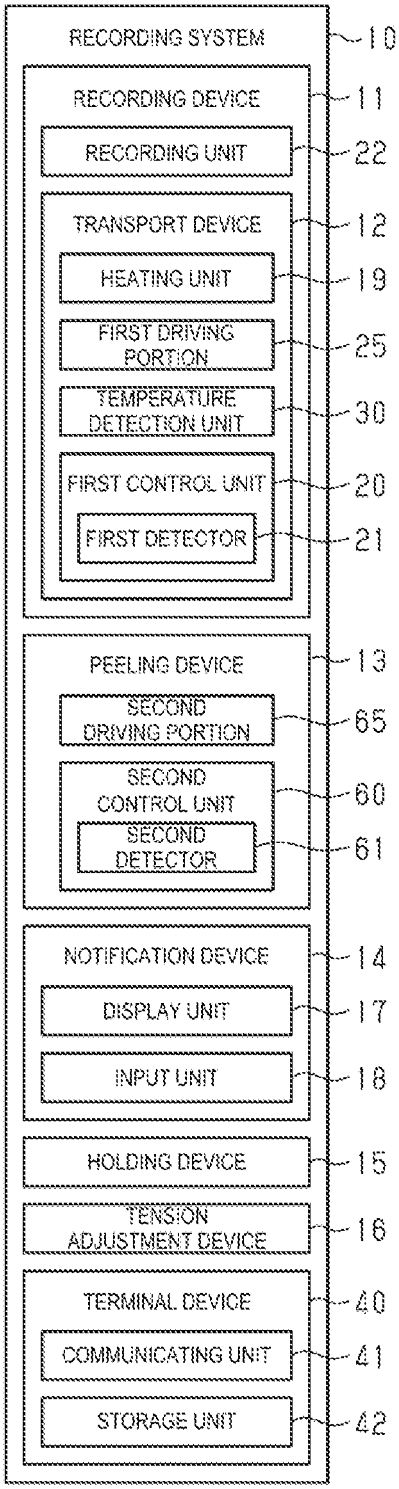
FIG. 8 is a block diagram illustrating a recording system according to a second embodiment.
Figure 9:
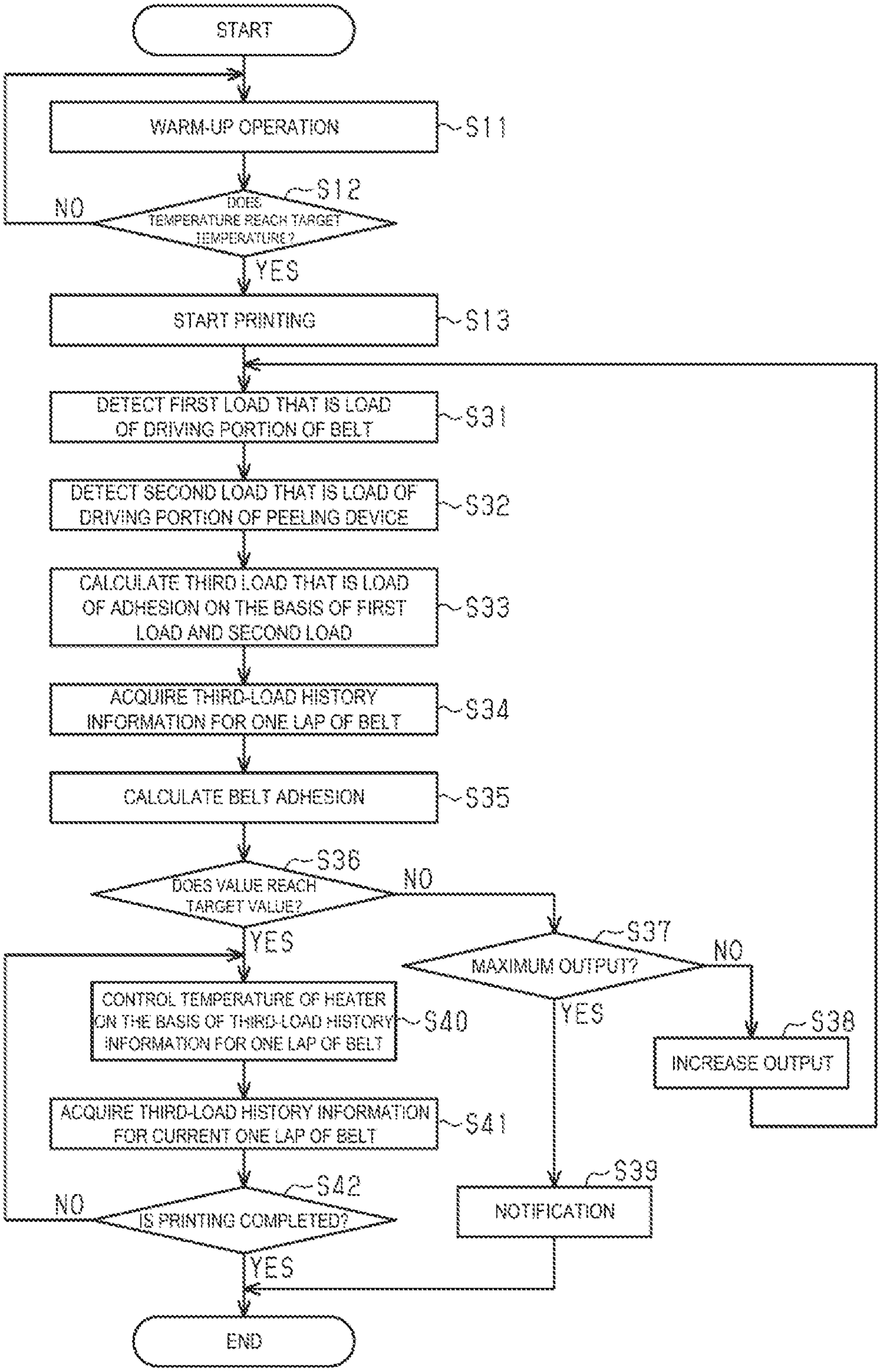
FIG. 9 is a flowchart showing a heating-temperature controlling process.

As illustrated in FIG. 8, the transport device 12 includes the control unit 20 similar to that in the first embodiment, and the driving unit 25, and the control unit 20 includes the detector 21. In the second embodiment, for the purpose of convenience, these are referred to as a first control unit 20, a first driving unit 25, and a first detector 21 in order to distinguish them from the constituent elements of the peeling device 13.

As illustrated in FIG. 8, the peeling device 13 includes a second control unit 60 and a second driving unit 65. The second control unit 60 includes a second detector 61. The second driving unit serves as a driving source for the peeling device 13. The second driving unit 65 is driven to perform a winding operation in which the medium 99 is wound around a roll body. The second control unit 60 performs driving control of the second driving unit 65 to control the winding operation for the roll body. The second detector 61 detects a load of the second driving unit 65. The second detector 61 is, for example, a motor driver. The second detector 61 is achieved with a load-current detecting function of the motor driver. The second detector 61 is configured to detect a load of the second driving unit 65 as a load current. Note that the other constituent elements that constitute the recording system 10 are similar to those in the first embodiment.

The first control unit 20 can communicate with the second control unit 60 through the terminal device 40. The terminal device 40 receives, from the first control unit 20, information about a load current of the first driving unit 25 detected by the first detector 21, and also receives, from the second control unit 60, information about a load current of the second driving unit 65 detected by the second detector 61. The present embodiment differs from the first embodiment in that the first control unit 20 performs the heating temperature control on the basis of the load current of the first driving unit 25 detected by the first detector 21 and the load current of the second driving unit 65 received from the second control unit 60. Note that the first control unit 20 may be communicable directly with the second control unit 60 without intervention of the terminal device 40. In this case, the first control unit 20 receives, from the second control unit 60, information about the load current of the second driving unit 65 detected by the second detector 61.

Next, the heating-temperature controlling process performed by the first control unit 20 will be described with reference to FIG. 9. Note that, in the following description, the first control unit 20 is also referred to simply as a control unit 20 when the first control unit 20 and the second control unit 60 do not need to be distinguished from each other.

As for the processes in steps S11 to S13, the control unit 20 performs a process similar to that in the first embodiment. That is, the warm-up operation is performed in step S11. Once the temperature reaches the target temperature (determination of YES in step S12), printing starts (step S13). At the time of starting printing, the medium 99 is set at the transporting belt 23. Then, the medium 99 is transported by the transporting belt 23, and the medium 99 after recording is peeled from the transporting belt 23 by the peeling device 13. After this, the control unit 20 performs processes from step S31.

In step S31, the control unit 20 detects a first load that is a load of the driving unit 25 of the transporting belt 23.

In step S32, the control unit 20 detects a second load that is a load of the second driving unit 65 that is the driving unit of the peeling device 13. The control unit 20 receives, from the second control unit 60, second load information detected by the second control unit 60.

In step S33, the control unit 20 calculates a third load that is a load of the adhesion on the basis of the first load and the second load. Specifically, the control unit 20 calculates a peeling load received from the medium 99 being peeled on the basis of a detection result of the first detector 21 and a direction result from the second detector 61, the peeling load being obtained by removing a component of other loads resulting from contact with the cleaning portion 28 or the like, from the load that the transporting belt 23 receives at the time when the medium 99 is peeled. Here, the load that the second driving unit 65 receives from the medium 99 when the peeling device 13 peels the medium 99 from the transporting belt 23 is mainly a load that the medium 99 receives at the time of peeling. Meanwhile, when the transport device 12 includes the cleaning portion 28, the first load includes a load that the driving unit 25 receives from the medium 99 and a load received from a brush or blade of the cleaning portion 28. Thus, for example, the terminal device 40 calculates a difference between the first load and the second load, and the control unit 20 acquires the third load. Specifically, the terminal device 40 acquires information about the first load from the transport device 12, and also acquires information about the second load from the peeling device 13. In addition, on the basis of these pieces of information, the terminal device 40 calculates the third load, and transmits information about the third load to the first control unit 20 that the transport device 12 includes. Note that, when the first control unit 20 can communicate directly with the second control unit 60 without intervention of the terminal device 40, the control unit 20 may calculate a difference between the first load and the second load, whereby the control unit 20 acquires the third load.

In step S34, the control unit 20 acquires third-load history information that is history information about the third load for one lap of the belt. Here, the third-load history information for one lap of the belt is history information indicating a relationship between the third load and belt rotating positions for one lap of the belt in the past one turn.

In step S35, the control unit 20 calculates belt adhesion. For example, the control unit 20 calculates an average value of third loads for one lap of the belt on the basis of the third-load history information LP. The average value of third loads is calculated by dividing the integrated value of third loads for one lap of the belt by the number of measurement points (detection points). The control unit 20 refers to the reference data to convert the average value of third loads into the value of adhesion, thereby acquiring the belt adhesion. Note that the reference data indicating a relationship between the third load and the adhesion is stored in the memory for each type of cloth.

In step S36, the control unit 20 determines whether or not the belt adhesion reaches the target value. When the belt adhesion does not reach the target value, the process proceeds to step S37. On the other hand, when the belt adhesion reaches the target value, the process proceeds to step S40.

In step S37, the control unit 20 determines whether or not the heating unit 19 is at the maximum output. When the heating unit 19 is not at the maximum output, the process proceeds to step S38. After the output of the heating unit 19 is increased by a predetermined amount from the current output, the process proceeds to step S31. When the belt adhesion does not reach the target value even if the output is increased by the predetermined amount and reaches the maximum output (No in both steps S36 and S37), the control unit 20 proceeds to step S39.

In step S39, the control unit 20 make notification of information indicating the timing of replacing the adhesive. Specifically, the control unit 20 displays a message MS that prompts the replacement of the adhesive, at the notification screen 57 of the display unit 17 as illustrated in FIG. 6.

In step S40, the control unit 20 controls temperatures of the heater on the basis of the third-load history information for one lap of the belt. That is, the control unit 20 controls heating temperatures of the heating unit 19 on the basis of the load history information LP for one lap of the belt illustrated in FIGS. 3 and 4. However, the load history information LP used in the present embodiment is the third-load history information that is history information about the third load. That is, the load resulting from contact items such as a brush or blade of the cleaning portion 28 that are brought into contact with the transporting belt 23 is canceled. With this configuration, the control unit 20 controls temperatures of the heater 19H on the basis of the peeling load that the transporting belt 23 receives from the medium 99 peeled from the transporting belt 23.

In step S41, the control unit 20 acquires third-load history information for the current one lap of the belt. That is, the control unit 20 acquires the load history information LP for one lap of the belt illustrated in FIG. 4 during the current one lap of the belt. The control unit 20 performs the process in step S40 and the process in step S41 at each belt rotating position during the current one lap of the belt.

With this heating temperature control by the control unit 20, it is possible to obtain the adhesion that can achieve affixing with the target sticking force in a region where the pressing portion 27 affixes the medium 99 to the adhesive layer 32. Thus, it is possible to affix the medium 99 to the adhesive layer 32 with appropriate sticking force.

In step S42, the control unit 20 determines whether or not printing ends. When printing has not yet ended, the process returns to step S40, and each of the processes in step S40 and step S41 is repeatedly performed. Then, once printing ends, the control unit 20 ends a routine of this heating-temperature controlling process.

As described in detail above, the second embodiment provides the following effect.

(8) The transport system includes the transport device 12 similar to that in the first embodiment and the peeling device 13. The peeling device 13 includes the second control unit 60 including the second detector 61 configured to detect a load of the peeling device 13 when the medium 99 is peeled from the transporting belt 23, the second control unit 60 being configured to control the peeling device 13. The second control unit 60 transmits information about a detection result from the second detector 61 to the control unit 20. Of the loads that the transporting belt 23 receives when the medium 99 is peeled, the control unit 20 obtains a peeling load received from the medium 99 being peeled, on the basis of the detection result from the detector 21 and the detection result from the second detector 61. In addition, the control unit 20 controls the heating unit 19 on the basis of the peeling load. This configuration makes it possible to control the heating unit 19 on the basis of the peeling load in which the influence of the load of a contact item brought into contact with the transporting belt 23 is suppressed. Thus, it is possible to control the heating unit 19 so that more appropriate sticking force can be obtained. Note that the contact item includes a cleaning portion (for example, a cleaning brush or cleaning blade or the like) used to clean the transporting belt 23 or the like.

Third Embodiment

Next, a third embodiment will be described. The recording system 10 basically has a configuration similar to that in the second embodiment. The present embodiment is similar to the second embodiment in that the second detector 61 serving as one example of the detector included in the second control unit 60 of the peeling device 13 is configured to detect a load of the second driving unit 65 of the peeling device 13. The present embodiment differs from each of the embodiments in that the control unit 20 does not use a detection result from the detector 21 in the heating-temperature controlling process. For this reason, it may be possible to employ a configuration in which no detector 21 is provided in FIG. 8. In this third embodiment, the control unit 20 performs the heating-temperature controlling process on the basis of a detection result from the second detector 61 that detects a load of the second driving unit 65.

Below, the heating-temperature controlling process will be described with reference to FIG. 9. The control unit 20 does not include processed in steps S31 and S33 in a program for the heating-temperature controlling process illustrated in FIG. 9. In addition, in processes in steps S34, S40, and S41, each of the processes is performed by using the second-load history information that is history information for one lap of the belt concerning the second load, in place of the third-load history information. For the other processes, the processes illustrated in FIG. 9 are performed.

After printing has been started (step S13), in step S32, the control unit 20 first detects the second load that is a load of the second driving unit 65 of the peeling device 13. The control unit 20 receives, from the second control unit 60, second load information detected by the second control unit 60.

In the next step S34, the control unit 20 acquires the second-load history information that is history information about the second load for one lap of the belt. Here, the second-load history information for one lap of the belt is history information indicating a relationship between the second load and belt rotating positions for one lap of the belt in the past one turn.

In step S35, the control unit 20 calculates belt adhesion. For example, the control unit 20 calculates an average value of second loads for one lap of the belt on the basis of the second-load history information LP. The control unit 20 refers to the reference data to convert the average value of second loads into the value of adhesion, thereby acquiring the belt adhesion. Note that the reference data indicating a relationship between the second load and the adhesion is stored in the memory for each type of cloth.

In step S36, the control unit 20 determines whether or not the belt adhesion reaches the target value. When the belt adhesion does not reach the target value, the process proceeds to step S37. On the other hand, when the belt adhesion reaches the target value, the process proceeds to step S40.

In step S37, the control unit 20 determines whether or not the heating unit 19 is at the maximum output. When the heating unit 19 is not at the maximum output, the process proceeds to step S38. After the output of the heating unit 19 is increased by a predetermined amount from the current output, the process proceeds to step S31. When the belt adhesion does not reach the target value even if the output is increased by the predetermined amount and reaches the maximum output (No in both steps S36 and S37), the control unit 20 proceeds to step S39.

In step S39, the control unit 20 make notification of information indicating the timing of replacing the adhesive. Specifically, the control unit 20 displays a message MS that prompts the replacement of the adhesive, at the display unit 17 as illustrated in FIG. 6.

In step S40, the control unit 20 controls temperatures of the heater on the basis of the second-load history information for one lap of the belt. That is, the control unit 20 controls heating temperatures of the heating unit 19 on the basis of the load history information LP for one lap of the belt illustrated in FIGS. 3 and 4. However, the load history information LP used in the present embodiment is the second-load history information. That is, the heating unit 19 is controlled by using history information about the second load that does not include the load resulting from a contact item such as a brush or a blade of the cleaning portion 28 that is brought into contact with the transporting belt 23. Thus, the control unit 20 can control temperatures of the heater 19H on the basis of the peeling load that the transporting belt 23 receives from the medium 99 being peeled.

In step S41, the control unit 20 acquires the second-load history information for the current one lap of the belt. That is, the control unit 20 acquires the load history information LP for one lap of the belt illustrated in FIG. 4 during the current one lap of the belt. The control unit 20 performs the process in step S40 and the process in step S41 at each belt rotating position during the current one lap of the belt.

With this heating temperature control by the control unit 20, it is possible to obtain the adhesion that can achieve affixing with the target sticking force in a region where the pressing portion 27 affixes the medium 99 to the adhesive layer 32. Thus, it is possible to affix the medium 99 to the adhesive layer 32 with appropriate sticking force.

In step S42, the control unit 20 determines whether or not printing ends. When printing has not yet ended, the process returns to step S40, and each of the processes in step S40 and step S41 is repeatedly performed. Then, once printing ends, the control unit 20 ends a routine of this heating-temperature controlling process.

As described in detail above, the third embodiment provided the following effect.

(9) The recording system 10 includes the recording device 11 and the peeling device 13. The recording device 11 includes: the transporting belt 23 including the adhesive layer 32 and configured to transport the medium 99 affixed to the adhesive layer 32; the recording unit 22 configured to be able to perform recording on the medium 99; the heating unit 19 configured to be able to heat the adhesive layer 32; the first driving unit 25 configured to drive the transporting belt 23; and the first control unit 20 configured to control the first driving unit 25 and the heating unit 19. The peeling device 13 is configured to peel the medium 99 from the transporting belt 23. The peeling device 13 includes the second driving unit 65 configured to drive this peeling device 13, and the second control unit 60 including the second detector 61 configured to detect a load of the second driving unit 65, the second control unit 60 being configured to control the second driving unit 65. The second detector 61 is configured to be able to detect a load current flowing in the second driving unit 65 when the medium 99 is peeled from the transporting belt 23 by the peeling device 13. The first control unit 20 controls the heating unit 19 on the basis of a detection result from the second detector 61. This configuration makes it possible to control the heating unit 19 on the basis of the load of the second driving unit 65 detected by the second detector 61 included in the second control unit 60 of the peeling device 13. The load of the second driving unit 65 does not include a load of a contact item that is brought into contact with the transporting belt 23. Thus, it is possible to control the heating unit 19 so that more appropriate sticking force can be obtained. Note that the contact item includes the cleaning portion 28 configured to clean the transporting belt or the like.

Note that the embodiments described above can be modified into the following modification examples. Furthermore, it may be possible to combine the embodiments described above and the following modification examples on an as-necessary basis to obtain another modification example, and it may be also possible to combine the following modification examples with each other on an as-necessary basis to obtain another modification example.

Figure 10:
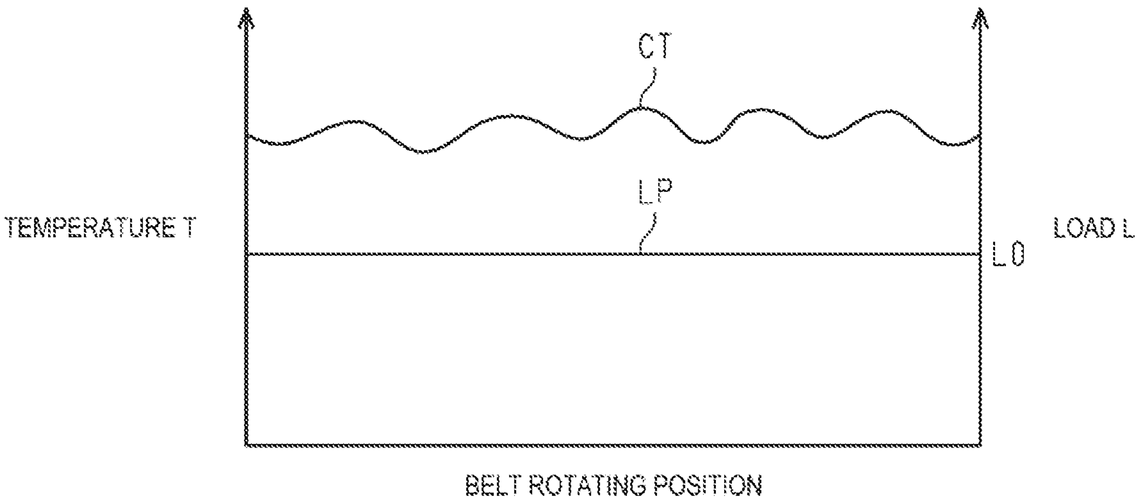
FIG. 10 is a graph used to explain a heating-temperature controlling process according to a modification example.

In the heating-temperature controlling process illustrated in FIG. 4, the control 20 performs the heating temperature control using the control temperature CT that allows the minimum value of the load history information LP to be equal to or more than the target load L0, and the heating temperature control is performed for every control cycle that is equal to a period of time required for the transporting belt 23 to circulate one lap (one turn). However, the heating temperature control is not limited to this. For example, the control unit 20 may perform the heating temperature control using the control temperature CT as illustrated in FIG. 10. Here, a control cycle Δt is set as a period (tb/N) obtained by dividing a period tb required to rotate for one lap of the belt by a natural number N equal to or more than 2. The control unit 20 performs the heating temperature control using the control temperature CT obtained by performing feedback calculation that brings a detected load close to the target load L0 for every control cycle Δt. That is, the control unit 20 performs feedback control that brings a detected load close to the target load L0 so that a belt portion on the transporting belt 23 that reaches the heating position P1 is heated with the target temperature corresponding to the position of this belt portion. The detected load is acquired on the basis of the load history information LP (see FIG. 3) and the belt rotating position corresponding to this belt portion. In this manner, the control unit 20 is configured to perform heating control of the heater 19H by using a detected load at the time of peeling the medium 99 at the peeling position P2. Thus, feedback control is performed with a delay of a period of time required for a specific belt rotating position on the transporting belt 23 to move from the peeling position P2 to the heating position P1. Note that the target load L0 is a value greater than the minimum load for obtaining the peeling strength necessary at the time of peeling the medium 99. Thus, even if the result of the feedback control or the value of the load fluctuates to some degree, it is possible to obtain a value equal to or greater than the minimum required load. In addition, the control cycle Δt may be the same as the measurement cycle of the load or may differ from the measurement cycle. Furthermore, in place of the detected load, the control unit 20 may perform feedback control in which sticking force estimated on the basis of the detected load is brought close to the target sticking force.

In place of the control unit 20, the terminal device 40 may perform control of the heating unit 19 on the basis of a detection result from the detector 21. Specifically, load current information may be transmitted from the control unit 20 to the terminal device 40, and the terminal device 40 may transmit a control signal for the heating unit 19. That is, the transport system includes the terminal device 40. Once a control unit included in the terminal device 40 receives, from the control unit 20 of the transport device 12, load current information detected by the detector 21, the control unit included in the terminal device 40 transmits a control signal to the heating unit 19 on the basis of the received load current information. A driving circuit of the heating unit 19 controls an electric current value energized to the heater 19H on the basis of the control signal.

It may be possible to employ a configuration in which the transport device 12 includes a peeling unit, and the control unit 20 of the transport device 12 controls a rotational speed or the like of the second roll body R2 held by the peeling unit.

The peeling device 13 or the peeling unit may not be configured to wind the medium 99. That is, there is no limitation, provided that the medium 99 is pulled while predetermined tension is being applied to the medium 99 that is emitted from the transport device 12. In this case, the medium 99 may be alternately folded into a plurality of layers and be collected, rather than being collected into a roll form.

The terminal device 40 may control the peeling device 13. In addition, the terminal device 40 may control both the transport device 12 and the peeling device 13.

The control unit 20 may control the driving unit 25 through voltage control, in place of current control.

The detector 21 is not limited to the function of detecting an electric current value of the motor driver. For example, the detector 21 may detect a load that the transporting belt 23 receives, on the basis of the amount of change in velocity of the driving unit 25. The amount of change in velocity of the driving unit 25 at the time of peeling the medium 99 from the transporting belt 23 depends on the load that transporting belt 23 receives at the time of peeling the medium 99. The control unit 20 acquires the amount (difference) of change in velocity of the driving unit 25 on the basis of a detected signal of the encoder 35. The control unit 20 may control the heating unit 19 by using the amount of change in velocity of the driving unit 25 as a detection result of the load of the driving unit 25. Alternatively, the control unit 20 may detect a load that the transporting belt 23 on the basis of the value of output torque of the driving unit 25 or the value of input voltage of the driving unit 25.

It may be possible to use a belt-contact detector described in JP-A-2006-315824 to control the heating unit on the basis of a detection result from the detector. The detector is configured to be brought into contact with the transporting and rotate. For example, the control unit 20 may control the heating unit 19 so that temperatures increase upon the belt-contact detector stopping rotation. Furthermore, it may be possible to employ a configuration in which the number of rotations of the belt-contact detector can be detected, and the control unit 20 controls the heating unit 19 with temperatures at which necessary sticking force can be obtained, on the basis of the detection result (number of detected rotations) of this detector. With this configuration, it is possible to make notification of the timing of replacing the adhesive, and it is also possible to heat the adhesive layer 32 with temperatures at which necessary sticking force can be obtained even during the time when the transporting belt is in use.

The control unit 20 may control the heating unit 19 so that the adhesive layer 32 has necessary adhesion for each type of medium (for example, each type of cloth), on the basis of load (for example, load current) detected by the detector 21.

The heating temperature control may be feed forward control.

It may be possible to obtain sticking force on the basis of a load value or average load value detected by the detector 21 when the transporting belt 23 is rotated by a predetermined amount less than one turn, without using the load history information, and control the heating unit 19 with temperatures at which the obtained sticking force is the target sticking force.

The adhesive layer may not include adhesive, and the transporting belt may have a front surface layer made out of a material having adhesiveness. In summary, the adhesive layer is only necessary to be a front surface layer having adhesion increased by heating. The adhesive layer may be obtained through application to the transporting belt 23, or may be a portion of the transporting belt 23.

The medium 99 may be roll paper. In addition, the medium 99 may be a sheet or film made of plastic, metal, laminate, or ceramic.

Below, description will be made of technical concepts as well as operation and effects thereof that are understood from the above-described embodiments and modified examples.

(A) A transport system includes a transport device including: a transporting belt including an adhesive layer and configured to transport a medium affixed to the adhesive layer; a heating unit configured to heat the adhesive layer; a driving unit configured to drive the transporting belt; and a control unit including a detector configured to detect a load of the driving unit, the control unit being configured to control the driving unit and the heating unit, the transport system also includes a peeling device configured to peel the medium from the transporting belt, in which the detector is configured to detect the load of the driving unit when the medium is peeled from the transporting belt by the peeling device, and the control unit controls the heating unit on a basis of a detection result from the detector.

With the configuration described above, it is possible to control the heating unit on the basis of a load of the driving unit at the time when the medium is actually peeled. As sticking force of the medium relative to the transporting belt changes, the load of the driving unit at the time when the medium is peeled also changes. Thus, it is possible to heat the adhesive layer with temperatures at which necessary sticking force can be obtained. Note that, since the load of the driving unit at the time when the medium is actually peeled from the adhesive layer is detected, the sticking force is detected with high accuracy. Thus, it is possible to accurately control the heating unit so that necessary sticking force can be obtained at the adhesive layer.

(B) The transport system described above may include a notification device configured to make notification of an operating status of the transport device. The control unit may cause the notification device to make notification of information that prompts replacement of an adhesive when the heating unit heats the transporting belt with maximum output that the heating unit can output and adhesion based on the load is equal to or less than a threshold value.

The configuration described above allows a user to easily acquire an indication of replacement of the adhesive.

(C) The transport system described above may include an input unit into which an instruction is input, and the threshold value may be input through the input unit.

The configuration described above allows a user to set an optimum threshold value.

(D) The transport system described above may include a temperature detection unit configured to detect a temperature of the transporting belt.

The configuration described above makes it possible to appropriately control the heating unit on the basis of a detection result of the temperature detection unit even in a heating preparation period prior to detection of a load of the driving unit at the time when the medium is peeled from the transporting belt.

(E) In the transport system, the peeling device may include the second control unit including the second detector configured to detect a load of the peeling device when the medium is peeled from the transporting belt, the second control unit being configured to transmit information about a detection result from the second detector to the control unit and control the peeling device. The control unit may calculate a peeling load among a load that the transporting belt receives when the medium is peeled, the peeling load being received from the medium being peeled, the peeling load being calculated on the basis of a detection result from the detector and a detection result from the second detector. The control unit may control the heating unit on the basis of this peeling load.

The configuration described above allows the heating unit to be controlled on the basis of a peeling load in which the influence of the load of a contact item brought into contact with the transporting belt is suppressed. Thus, it is possible to control the heating unit so that more appropriate sticking force can be obtained. Note that the contact item includes a cleaning portion configured to clean the transporting belt or the like.

(F) A transport device including a transporting belt configured to transport a medium peeled by a peeling device, the transporting device including: a heating unit configured to heat the transporting belt; a driving unit configured to drive the transporting belt; and a control unit including a detector configured to detect a load of the driving unit, the control unit being configured to control the driving unit and the heating unit, in which the transport belt includes an adhesive layer and is configured to transport the medium affixed to the adhesive layer, the heating unit is configured to heat the adhesive layer, the detector is configured to detect the load of the driving unit when the medium is peeled from the transporting belt by the peeling device, and the control unit controls the heating unit on the basis of a detection result from the detector.

The configuration described above makes it possible to heat the adhesive layer with a temperature at which necessary sticking force can be obtained.

(G) A recording system includes: a transporting belt including an adhesive layer and configured to transport a medium affixed to the adhesive layer; a recording unit configured to perform recording on the medium; a heating unit configured to heat the adhesive layer; a first driving unit configured to drive the transporting belt; a recording device including a first control unit configured to control the first driving unit and the heating unit; and a peeling device configured to peel the medium from the transporting belt, in which the peeling device includes a second driving unit configured to drive the peeling device and also includes a second control unit including a detector configured to detect a load of the second driving unit and configured to control the second driving unit, the detector is configured to detect the load of the second driving unit when the medium is peeled from the transporting belt by the peeling device, and the first control unit is configured to control the heating unit on the basis of a detection result from the detector.

The configuration described above makes it possible to control the heating unit on the basis of the load of the second driving unit detected by the detector included in the second control unit of the peeling device. The load of the second driving unit does not include a load of a contact item brought into contact with the transporting belt. This makes it possible to control the heating unit so that more appropriate sticking force can be obtained. Note that the contact item includes a cleaning portion configured to clean the transporting belt or the like.

(H) Provided is a method of controlling a transport device including: a transporting belt including an adhesive layer and configured to transport a medium affixed to the adhesive layer; a heating unit configured to heat the adhesive layer; and a driving unit configured to drive the transporting belt, the method including: detecting a load of the driving unit when the medium is peeled from the transporting belt; and controlling the heating unit on the basis of a value of the detected load.

The method described above makes it possible to heat the adhesive layer with a temperature at which necessary sticking force can be obtained.

What is claimed is:

1. A transport system comprising a transport device including:

a transporting belt including an adhesive layer and configured to transport a medium affixed to the adhesive layer;

a heating unit configured to heat the adhesive layer;

a driving unit configured to drive the transporting belt; and a control unit including a detector configured to detect a load of the driving unit, the control unit being configured to control the driving unit and the heating unit, and a peeling device configured to peel the medium from the transporting belt, wherein the detector is configured to detect the load of the driving unit by detecting a load current according to a magnitude of the load flowing in the driving unit at a moment when the medium is peeled from the transporting belt by the peeling device, and the control unit controls the heating unit on a basis of a detection result from the detector.

2. The transport system according to claim 1, comprising:

a notification device configured to make notification of an operating status of the transport device, wherein the control unit causes the notification device to make notification of information that prompts replacement of an adhesive when the heating unit heats the transporting belt with maximum output that the heating unit is configured to output and adhesion based on the load is equal to or less than a threshold value.

3. The transport system according to claim 2, comprising an input unit into which an instruction is input, wherein the threshold value is configured to be input through the input unit.

4. The transport system according to claim 1, comprising a temperature detection unit configured to detect a temperature of the transporting belt.

5. The transport system according to claim 1, wherein the peeling device includes a second control unit including a second detector configured to detect a load of the peeling device when the medium is peeled from the transporting belt, the second control unit being configured to transmit information of a detection result from the second detector to the control unit and control the peeling device, the control unit calculates a peeling load among loads that the transporting belt receives when the medium is peeled, the peeling load being received from the medium being peeled, the peeling load being calculated on a basis of a detection result from the detector and a detection result from the second detector, and the control unit controls the heating unit on a basis of the peeling load.

6. A transport device that includes a transporting belt configured to transport a medium to be peeled by a peeling device, the transporting device comprising:

a heating unit configured to heat the transporting belt;

a driving unit configured to drive the transporting belt; and a control unit including a detector configured to detect a load of the driving unit, the control unit being configured to control the driving unit and the heating unit, wherein the transport belt includes an adhesive layer and is configured to transport the medium affixed to the adhesive layer, the heating unit is configured to heat the adhesive layer, the detector is configured to detect the load of the driving unit by detecting a load current according to a magnitude of the load flowing in the driving unit a moment when the medium is peeled from the transporting belt by the peeling device, and the control unit controls the heating unit on a basis of a detection result from the detector.

7. A recording system comprising:

a recording device including a transporting belt including an adhesive layer and configured to transport a medium affixed to the adhesive layer, a recording unit configured to perform recording on the medium, a heating unit configured to heat the adhesive layer, a first driving unit configured to drive the transporting belt, and a first control unit configured to control the first driving unit and the heating unit, and a peeling device configured to peel the medium from the transporting belt, wherein the peeling device includes:

a second driving unit configured to drive the peeling device; and a second control unit including a detector configured to detect a load of the second driving unit and configured to control the second driving unit, the detector is configured to detect the load of the second driving unit by detecting a load current according to a magnitude of the load flowing in the driving unit at a moment when the medium is peeled from the transporting belt by the peeling device, and the first control unit is configured to control the heating unit on a basis of a detection result from the detector.

* * * * *